(12) United States Patent
Bradley et al.

(10) Patent No.: US 8,666,322 B1
(45) Date of Patent: Mar. 4, 2014

(54) SYSTEM AND METHOD FOR MEASURING AND LOCATING PASSIVE INTERMODULATION (PIM) SOURCES IN A NETWORK AND/OR DEVICE

(75) Inventors: Donald Anthony Bradley, Morgan Hill, CA (US); Frank Tiernan, Saratoga, CA (US)

(73) Assignee: Anritsu Company, Morgan Hill, CA (US)

( * ) Notice: Subject to any disclaimer, the term of this patent is extended or adjusted under 35 U.S.C. 154(b) by 99 days.

(21) Appl. No.: 13/360,495

(22) Filed: Jan. 27, 2012

(51) Int. Cl.
*H04B 17/00* (2006.01)
(52) U.S. Cl.
USPC .............. 455/67.11; 455/67.3; 455/67.13; 324/612; 324/624
(58) Field of Classification Search
USPC .......... 455/67.3, 67.11, 67.13; 324/612, 624, 324/650
See application file for complete search history.

(56) References Cited

U.S. PATENT DOCUMENTS

2002/0094785 A1* 7/2002 Deats ..................... 455/67.3
2009/0096466 A1* 4/2009 Delforce et al. .......... 324/612

* cited by examiner

*Primary Examiner* — Tuan H Nguyen
(74) *Attorney, Agent, or Firm* — Meyer IP Law Group

(57) ABSTRACT

An embodiment of a system for determining a distance and magnitude to one or more unknown passive intermodulation (PIM) sources associated with a network under test comprises a scalar PIM measuring instrument and a reference PIM source. The scalar PIM measuring instrument has an output frequency that is systematically changeable to produce a series of response signals of varying frequency and the reference PIM source is configured to introduce a reflected signal to the scalar PIM measuring instrument in response to the output frequency. The scalar PIM measuring instrument can perform data processing algorithms allowing the extraction of distance and magnitude information about the unknown PIM sources located along the network under test from scalar data received by the scalar PIM measuring instrument. The scalar data received by the scalar PIM measuring instrument represents a combination of signals from the unknown PIM sources and the reference PIM source.

14 Claims, 5 Drawing Sheets

SYSTEM AND METHOD FOR MEASURING AND LOCATING PASSIVE INTERMODULATION (PIM) SOURCES IN A NETWORK AND/OR DEVICE

BACKGROUND

1. Technical Field

The present invention relates to passive intermodulation (PIM) and systems and methods for measuring PIM in a network and/or device.

2. Related Art

Passive intermodulation (PIM) causes an unwanted signal or signals to be generated by the non-linear mixing of two or more frequencies in a passive device such as a connector or cable. PIM has surfaced as a problem for cellular telephone technologies including Global System for Mobile Communications (GSM), Advanced Wireless Service (AWS) and Personal Communication Service (PCS) systems. Cable assemblies connecting a base station to an antenna on a tower using these cellular systems typically have multiple connectors that can act as sources of PIMs that interfere with system operation.

PIM signals are created when two signals from different systems or the same system combine and are then reflected at a PIM point such as a faulty cable connector. If the generated PIM harmonic frequency components fall within the receive band of a base station, it can effectively block a channel and make the base station receiver think that a carrier is present when one is not. Generally the components of concern are third, fifth, and seventh order, where the third order is of greatest signal strength, and therefore, of primary concern. PIMs can occur when two base stations operating at different frequencies, such as an AWS device and a PCS device, are in close proximity.

PIMs can be reduced or eliminated by replacing faulty cables or connectors. Test systems exist for determining the distance and magnitude to sources of PIMs, allowing a technician to locate and replace the faulty cable or connector. A test system to measure PIMs creates signals at two different frequencies, amplifies them, and provides them through cables connecting a base station to antennas on a tower for the base stations. A return signal carrying the PIMs is filtered to select a desired test frequency harmonic where PIMs can be detected and the PIM and distance to PIM measurement is provided to an operator. What are needed are improved systems and methods for determining the magnitude of and distance to PIM sources.

SUMMARY OF THE INVENTION

Embodiments of the present invention are related to systems and methods for use therewith for determining a magnitude and distance to one or more passive intermodulation (PIM) sources within devices and/or networks using scalar measuring instruments. In accordance with an embodiment, a system for determining a distance and magnitude to one or more unknown passive intermodulation (PIM) sources associated with a network under test, comprises a scalar PIM measuring instrument having an output frequency that is systematically changeable to produce a series of response signals of varying frequency and a reference PIM source adapted to be arranged between the network under test and the scalar PIM measuring instrument and configured to introduce a reflected signal to the scalar PIM measuring instrument in response to the output frequency. Data processing algorithms are then used to extract distance and magnitude information about the unknown PIM sources located along the network under test from scalar data received by the scalar PIM measuring instrument. The scalar data received by the scalar PIM measuring instrument represents a combination of signals from the unknown PIM sources and the reference PIM source.

In a further embodiment, the reference PIM source is a component of the PIM measuring instrument and the scalar PIM measuring instrument includes a port. The network and/or device for test is connectable with the scalar PIM measuring instrument at the port.

In an alternative embodiment, the scalar PIM measuring instrument includes a first port and the reference PIM source includes a second and third port. The second port of the reference PIM source is connectable with the first port of the scalar PIM measuring instrument. The network and/or device for test is connectable with the third port of the reference PIM source.

In a further embodiment, the reference PIM source intrudes on a uniform field in a signal path between the network under test and the scalar PIM measuring instrument to introduce the reflected signal to the scalar PIM measuring instrument.

In a further embodiment, the data processing algorithms used to extract the distance and magnitude information about the unknown PIM sources located along the network under test from scalar data include at least one of inverse fast Fourier transform (FFT) algorithms, sine wave extraction algorithms, and chirp z-transform (CZT) algorithms.

In a further embodiment, a system for use with a scalar passive intermodulation (PIM) measuring instrument to determine a distance and magnitude to one or more unknown PIM sources associated with a network under test comprises a reference PIM source adapted to be arranged between the network under test and the scalar PIM measuring instrument and configured to introduce a reflected signal to the scalar PIM measuring instrument in response to output signals generated by the scalar PIM measuring instrument. The system further comprises a a computer readable medium including instructions executable by at least one processor of the scalar PIM measuring instrument for generating output signals that are systematically changed and for performing data processing algorithms. The data processing algorithms allow the extraction of distance and magnitude information about the unknown PIM sources located along the network under test from scalar data received by the scalar PIM measuring instrument. Generating output signals that are systematically changed produces a series of response signals of varying frequency represents a combination of signals from the unknown PIM sources and the reference PIM source. The scalar PIM measuring instrument receives scalar data based on the response signals, and the distance and magnitude information about the unknown PIM sources located along the network under test is extractable from the scalar data received by the scalar PIM measuring instrument.

In an embodiment, a method of determining a magnitude of, and a distance to, one or more unknown passive intermodulation (PIM) sources associated with a network and/or device under test can comprise using a scalar PIM measuring instrument and a reference PIM source adapted to be arranged between the network and/or device under test and the scalar PIM measuring instrument. The reference PIM source is configured to introduce a reflected signal to the scalar PIM measuring instrument in response to the output frequency. The network and/or device is connected with the scalar PIM measuring instrument such that the reference PIM source is arranged between the network under test and the scalar PIM measuring instrument. Output signals are then transmitted from the scalar PIM measuring instrument to the network and/or device under and systematically changed to produce a series of response signals of varying frequency. Scalar data representing a combination of signals from the unknown PIM sources and the reference PIM source is obtained at the scalar PIM measuring instrument. Distance and magnitude information about the unknown PIM sources located along the network and/or device under test are extracted from scalar data obtained by the scalar PIM measuring instrument.

In a further embodiment, the magnitude and distance to the unknown PIM sources associated with the network under test is extracted by performing on the obtained scalar magnitudes at least one of inverse fast Fourier transform (FFT) algorithms, sine wave extraction algorithms, and chirp z-transform (CZT) algorithms.

BRIEF DESCRIPTION OF THE DRAWINGS

Further details of the present invention are explained with the help of the attached drawings in which.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. Like parts or elements may be described in a single embodiment, or they may be described in multiple embodiments.

Figure 1:
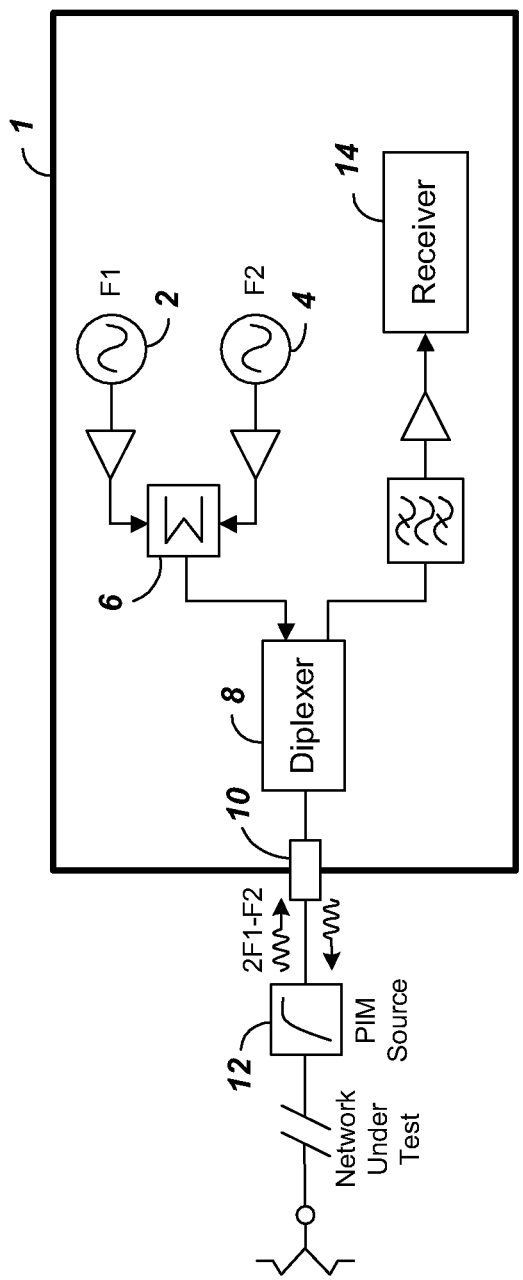
FIG. 1 is a block diagram of components of a prior art scalar PIM measuring instrument.

FIG. 1 is a block diagram of an exemplary prior art scalar PIM measuring instrument 1 for measuring PIM. The scalar PIM measuring instrument 1 utilizes two signal sources, with a first signal source 2 producing a signal at frequency F1 and the second signal source 4 producing a signal at frequency F2. When these multiple signals are allowed to share the same signal path in a nonlinear transmission medium, unwanted signals related to PIM sources can occur. The third order response can be particularly troublesome as it produces signals at 2F1-F2 as well as 2F2-F1. Test signals F1, F2 generated by the signal sources 2, 4 are provided to a combiner 6 to create a combined signal with frequencies F1 and F2 at the combiner output. A diplexer 8 passes the combined signal F1 and F2 to a test port 10 connected with a device and/or network. Where the device and/or network includes a PIM source 12, a reverse or reflected signal is produced at frequency 2F1-F2 and returned to the scalar PIM measuring instrument 1. The reverse or reflected signal is mixed and down converted to a target intermediate frequency. The intermediate frequency signal is amplified, the magnitude of the intermediate frequency signal is detected by a receiver 14 and a PIM measurement is obtained. The scalar PIM measuring instrument 1 can provide a magnitude measurement of the PIM in the device and/or network under test, but cannot provide distance information. A PIM source in a network, for example, can be difficult to identify without location information. Embodiments of systems and methods in accordance with the present invention can be applied to determine a distance to a PIM source, as well as a magnitude of the PIM, using a scalar PIM measuring instrument. Such embodiments can extend the usability of existing equipment and/or can provide a solution to determining distance to PIM that relies on less circuitry than other presently available solutions.

Figure 2A:
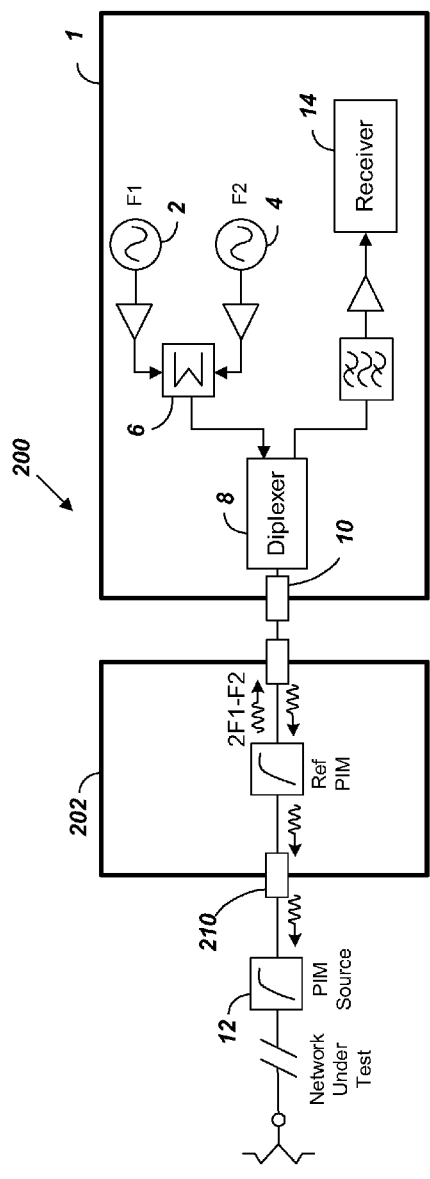
FIG. 2A is a block diagram of an embodiment of a system in accordance with the present invention for determining the magnitude of and the distance to one or more unknown PIM sources.
Figure 2B:
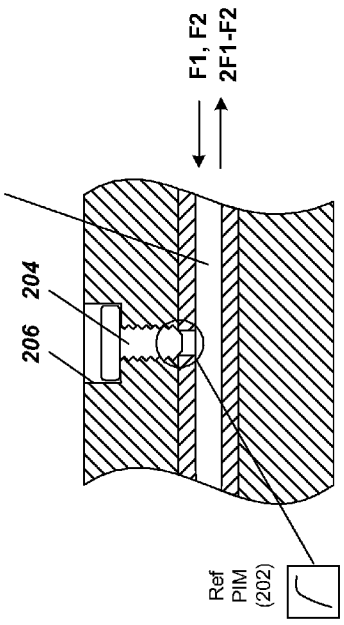
FIG. 2B is an exemplary configuration for the embodiment of FIG. 2A including a reference PIM source connected to a port of a scalar PIM measuring instrument.
Figure 2C:
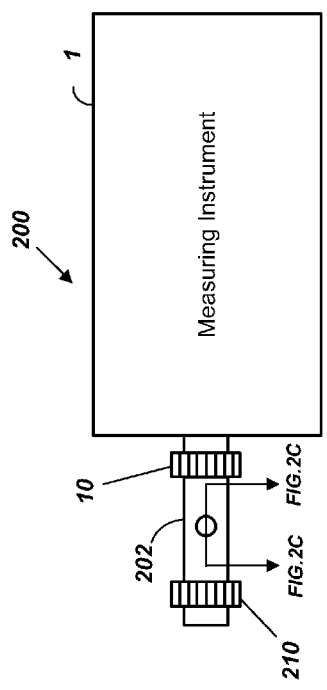
FIG. 2C is cross-section illustrating an exemplary reference PIM source for use with the system of FIGS. 2A and 2B.

FIGS. 2A-2C illustrate an embodiment of a system 200 in accordance with the present invention for measuring magnitude and distance to a PIM source. The system 200 comprises a scalar PIM measuring instrument 1 and a reference PIM source 202. The reference PIM source 202 is adapted to introduce a reflected signal to the scalar PIM measuring instrument 1 in response to an output frequency from the PIM measuring instrument 1. The reference PIM source 202 can be connected at a test port 10 of the PIM measuring instrument 1 while providing a connector 210 for connecting a device and/or network for test. The reference PIM has a known magnitude and is a known distance from the test port 10. Adding a reference PIM at the test port induces a ripple pattern in the scalar magnitude data detected from other sources of PIM in the device and/or network. Systems in accordance with the present invention further comprise data processing circuitry and instructions for generating output signals and applying data analysis algorithms to analyze the scalar magnitude data and extract distance information based on changes in the ripple pattern induced in the data. The algorithms can be based on embodiments of methods in accordance with the present invention.

Figure 3:
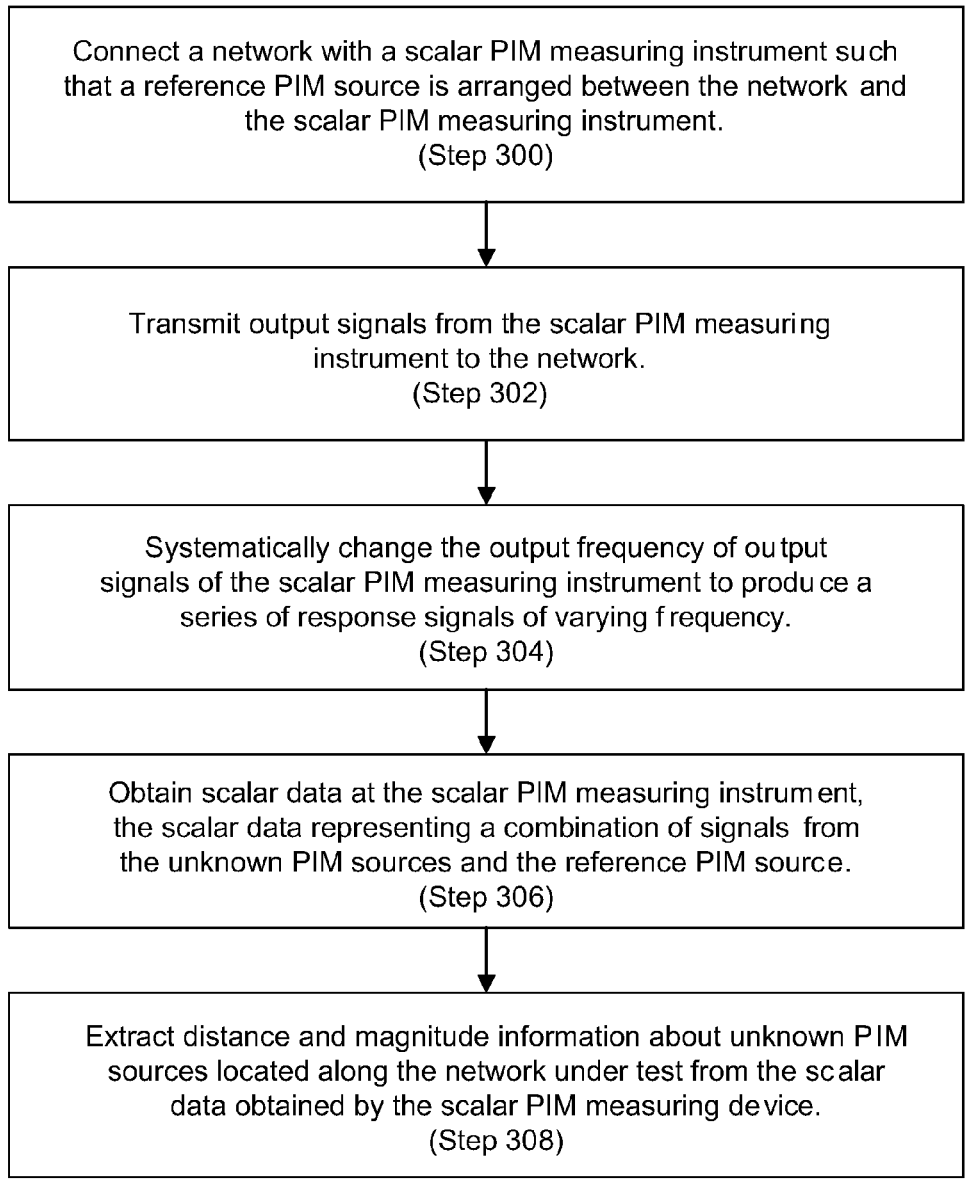
FIG. 3 is a flowchart of an embodiment of a method in accordance with the present invention for determining the magnitude of and the distance to one or more unknown PIM sources.

Referring to FIG. 3, an embodiment of a method in accordance with the present invention to determine a magnitude of, and a distance to, one or more unknown PIM sources associated with a network is shown. The method comprises using a scalar PIM measuring instrument and a reference PIM source adapted to be arranged between the network and the scalar PIM measuring instrument. The reference PIM source is configurable to introduce a reflected signal to the scalar PIM measuring instrument in response to an output frequency of a signal generated by the PIM measuring instrument. The reference PIM source has a magnitude and distance from a detector of the scalar PIM measuring instrument that is substantially known.

The method comprises connecting the network with the scalar PIM measuring instrument such that the reference PIM source is arranged between the network and the scalar PIM measuring instrument (Step 300). Output signals from the scalar PIM measuring instrument are transmitted to the network (Step 302) and the output frequencies of the output signals are systematically changed to produce a series of response signals of varying frequency (Step 304). Scalar data representing a combination of signals from the unknown PIM sources and the reference PIM source are obtained at the scalar PIM measuring instrument (Step 306). Distance and magnitude information about the unknown PIM sources located along the network under test is then extracted from the scalar data (Step 308). Extraction of the distance and magnitude information from the scalar magnitude data can be achieved be performing data analysis algorithms on the scalar magnitude data capable of separating the ripple pattern. Such data analysis algorithms can include, for example, at least one of inverse fast Fourier transform (FFT) algorithms, sine wave extraction algorithms, and chirp z-transform (CZT) algorithms.

As shown in the cross-section of FIG. 2C the reference PIM can be introduced by a pin 204. Intruding a pin with a dissimilar metal into the uniform field set up in the signal path by two high power test frequencies creates the PIM. The pin 204 acts as a reference PIM source when predictably positioned in a bore 206 allowing access to the signal path 208. The pin 204 can be, for example, a threaded set screw that intrudes on the uniform field in the signal path by advancing the pin 204 along threads of the bore 206 until a head of the pin 204 is seated or until the pin 204 is otherwise desirably arranged relative to the signal path 208. The amount of intrusion of the pin 204 into the uniform field can determine the amount of PIM generated, so a controlled depth is desirable. One technique for controlling depth can include controlling the location of the pin when the pin is fully seated within the bore. In desired embodiments, the reference PIM remains introduced to the signal path. However, in other embodiments, the reference PIM can be temporarily introduced to the signal path by backing the pin out of the bore, or for example, through the use of a spring-biased button that requires the button to be actively engaged. In such embodiments, the reference PIM can be introduced to the signal path by pressing and holding the button to overcome the bias spring force. In other embodiments a button and pin arrangement can be used whereby upon pressing and releasing the button the pin remains within the uniform field in the signal path until the button is pressed and released a second time. In still other embodiments, a switch can be used to introduce a PIM source to the signal path. One of ordinary skill in the art, upon reflecting on the embodiments described above will appreciate the myriad different ways in which a PIM source can be temporarily or persistently introduced to the signal path. The present invention is not intended to be limited to the embodiments shown in FIGS. 2B and 2C.

Figure 4:
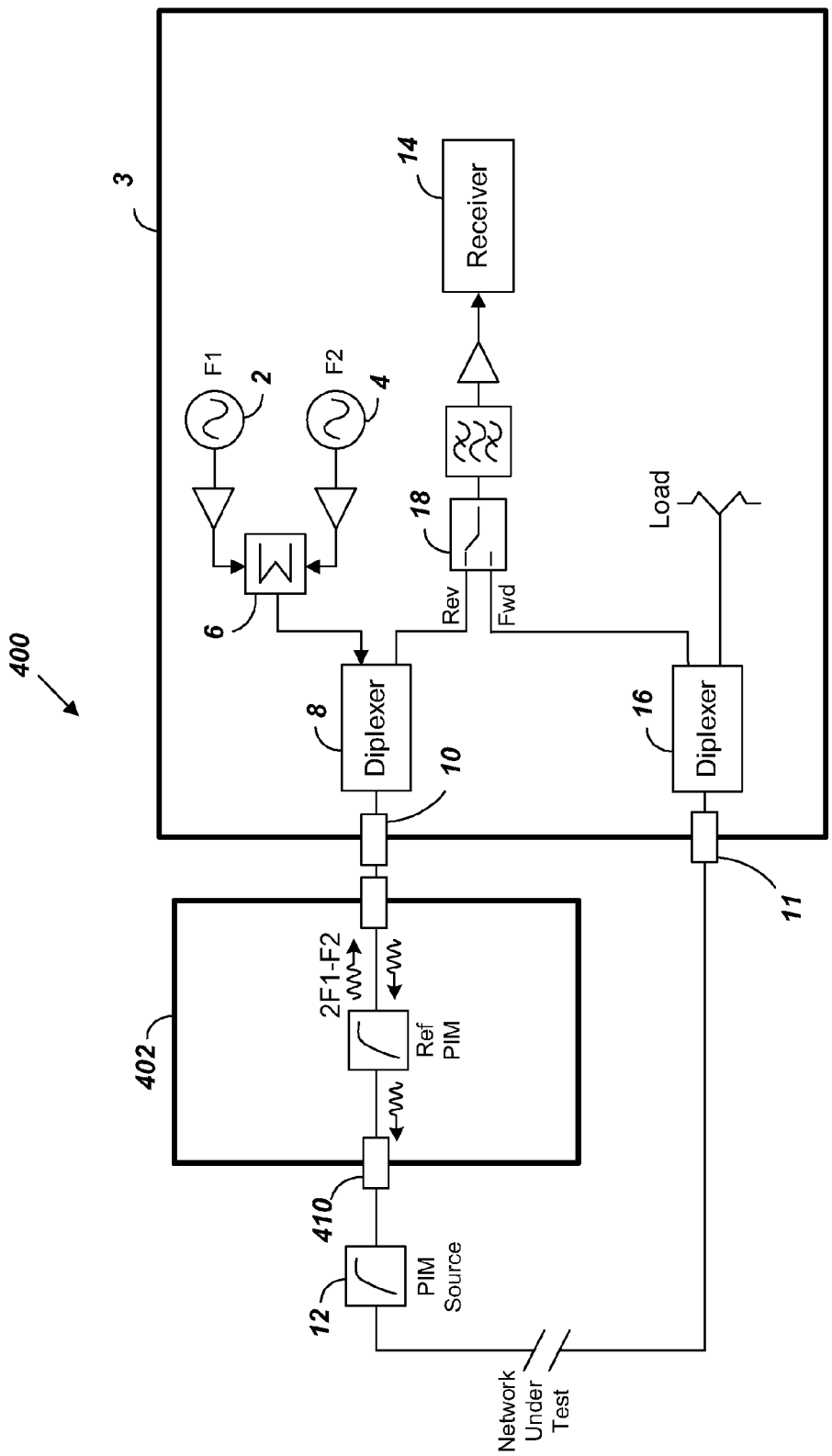
FIG. 4 is a block diagram of an alternative embodiment of a system in accordance with the present invention for determining the magnitude of and the distance to one or more unknown PIM sources.

The system of FIGS. 2A-2C comprises a scalar PIM measuring instrument configured to measure a reverse PIM measurement. In other embodiments, systems in accordance with the present invention can comprise a scalar PIM measuring instrument configured to measure one or both of a reverse PIM measurement and a forward PIM measurement. Referring to FIG. 4, an alternative embodiment of a system 400 in accordance with the present invention comprises a reference PIM source 402 connectable with a first port 10 of a scalar PIM measuring instrument 3 adapted to measure one or both of a reverse PIM measurement and a forward PIM measurement. A network can be connected between a port 410 of the reference PIM source 402 and a second port 11 of the scalar PIM measuring instrument 3.

Figure 5:
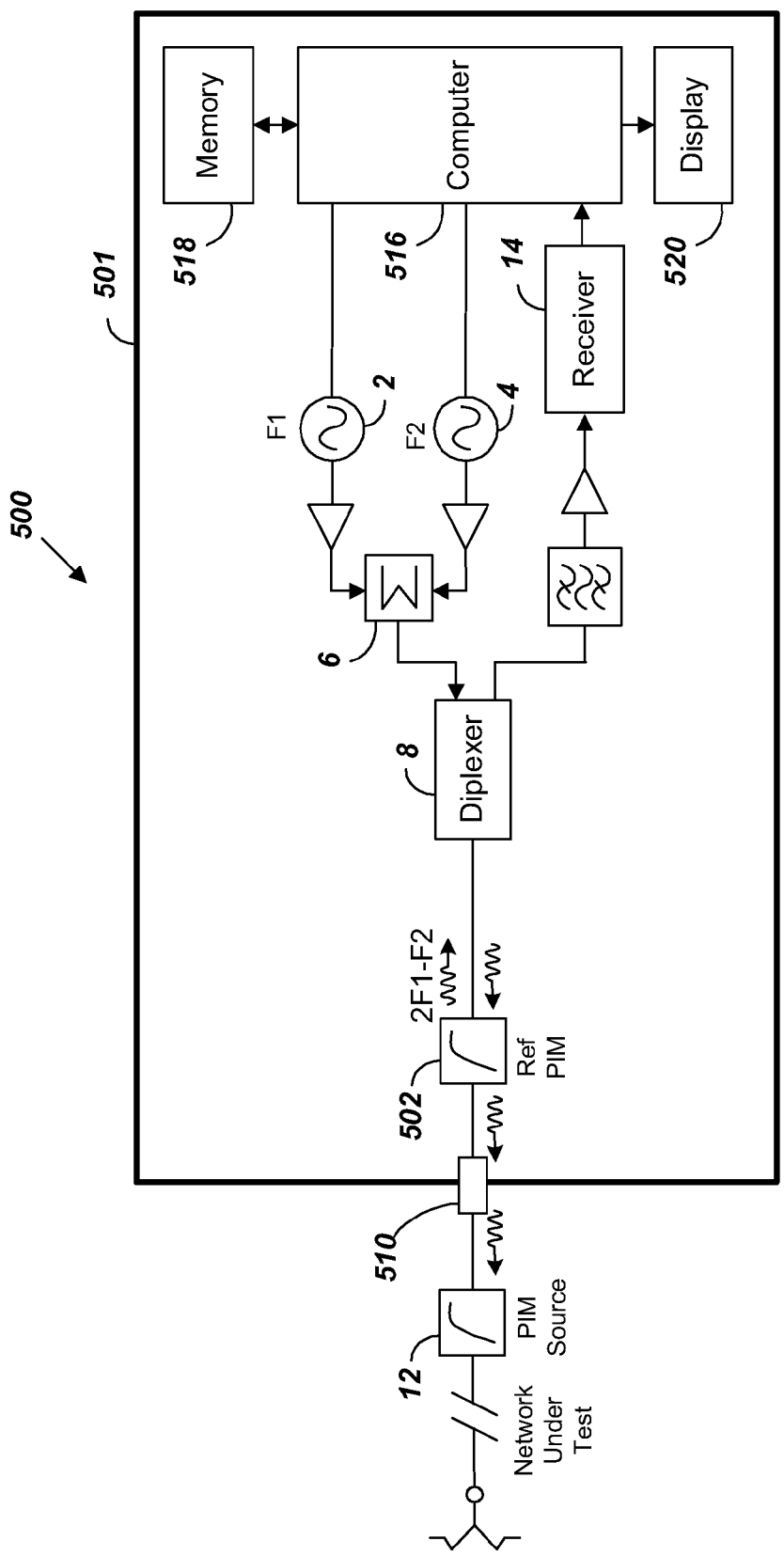
FIG. 5 is a block diagram of a further embodiment of a system in accordance with the present invention for determining the magnitude of and the distance to one or more unknown PIM sources.

As shown in FIGS. 2A-2C and 4, the reference PIM source is removably attachable with a scalar PIM measuring instrument. However, in other embodiments, a system in accordance with the present invention can comprise a scalar PIM measuring instrument that includes a reference PIM source as a component of the scalar PIM measuring instrument. Referring to FIG. 5, an alternative embodiment of a system in accordance with the present invention comprises a scalar PIM measuring instrument 501 including a reference PIM source 502 as a component of the instrument. The scalar PIM instrument 501 includes a single port 510 to which a device and/or network for test is connected. Integrating the reference PIM source 502 into a body of the PIM measuring instrument 501 can reduce the number of separate components. Integration can also reduce the number of mechanical connectors which, through constant connection and disconnection, can act as sources of PIM themselves. As shown in FIG. 5, the PIM measuring instrument 501 can further include components such as a computer 516, memory 518, and a display 520. The computer 516 can execute methods in accordance with the present invention to obtain scalar magnitude data and can execute the data analysis algorithms to extract distance as well as magnitude measurements from the scalar magnitude data. The computer 516 can include, for example, at least one processor. The memory (also referred to herein as a computer readable medium) can store instructions for executing the method and data analysis algorithms.

The foregoing descriptions of the present invention have been presented for purposes of illustration and description. They are not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A system for determining a distance and magnitude to one or more unknown passive intermodulation (PIM) sources associated with a network under test, comprising:
   a scalar PIM measuring instrument having an output frequency that is systematically changeable to produce a series of response signals of varying frequency;
   a reference PIM source adapted to be arranged between the network under test and the scalar PIM measuring instrument and configured to introduce a reflected signal to the scalar PIM measuring instrument in response to the output frequency;
   the scalar PIM measuring instrument further including
      at least one processor,
      a non-transitory computer readable medium including instructions for performing data processing algorithms using the at least one processor, the data processing algorithms allowing the extraction of distance and magnitude information about the unknown PIM sources located along the network under test from scalar data received by the scalar PIM measuring instrument,
      wherein the scalar data received by the scalar PIM measuring instrument represents a combination of signals from the unknown PIM sources and the reference PIM source; and
   wherein the reference PIM source has a magnitude and distance from a detector of the scalar PIM measuring instrument that is substantially known when the reference PIM source is arranged between the network under test and the scalar PIM measuring instrument.

2. The system of claim 1, wherein:
   the reference PIM source is a component of the PIM measuring instrument;
   the scalar PIM measuring instrument includes a port; and the network under test is connectable with the scalar PIM measuring instrument at the port.

3. The system of claim 1, wherein:
the scalar PIM measuring instrument includes a first port;
the reference PIM source includes a second port and a third port, the second port being connectable with the first port of the scalar PIM measuring instrument; and
the network under test is connectable with the third port of the reference PIM source.

4. The system of claim 1, wherein the reference PIM source intrudes on a uniform field in a signal path between the network under test and the scalar PIM measuring instrument to introduce the reflected signal to the scalar PIM measuring instrument.

5. The system of claim 1, wherein the data processing algorithms included on the computer readable medium include at least one of inverse fast Fourier transform (FFT) algorithms, sine wave extraction algorithms, and chirp z-transform (CZT) algorithms.

6. A system for use with a scalar passive intermodulation (PIM) measuring instrument to determine a distance and magnitude to one or more unknown PIM sources associated with a network under test, comprising:
a reference PIM source adapted to be arranged between the network under test and the scalar PIM measuring instrument and configured to introduce a reflected signal to the scalar PIM measuring instrument in response to output signals generated by the scalar PIM measuring instrument;
a non-transitory computer readable medium including instructions executable by at least one processor of the scalar PIM measuring instrument for generating output signals that are systematically changed and for performing data processing algorithms, the data processing algorithms allowing the extraction of distance and magnitude information about the unknown PIM sources located along the network under test from scalar data received by the scalar PIM measuring instrument,
wherein generating the output signals that are systematically changed produces a series of response signals of varying frequency represents a combination of signals from the unknown PIM sources and the reference PIM source;
wherein the scalar PIM measuring instrument receives scalar data based on the response signals;
wherein distance and magnitude information about the unknown PIM sources located along the network under test is extractable from the scalar data received by the scalar PIM measuring instrument; and
wherein the reference PIM source has a magnitude and distance from a detector of the scalar PIM measuring instrument that is substantially known when the reference PIM source is arranged between the network under test and the scalar PIM measuring instrument.

7. The system of claim 6, wherein:
the scalar PIM measuring instrument includes a port;
the reference PIM source is a component of the scalar PIM measuring instrument; and
the network under test is connectable with the scalar PIM measuring instrument at the port.

8. The system of claim 6, wherein:
the scalar PIM measuring instrument includes a first port;
the reference PIM source includes a second port and a third port, the second port being connectable with the first port of the scalar PIM measuring instrument; and
the network under test is connectable with the third port of the reference PIM source.

9. The system of claim 6, wherein the reference PIM source intrudes on a uniform field in a signal path between the network under test and the scalar PIM measuring instrument to introduce the reflected signal to the scalar PIM measuring instrument.

10. The system of claim 6, wherein the data processing algorithms included on the computer readable medium include at least one of inverse fast Fourier transform (FFT) algorithms, sine wave extraction algorithms, and chirp z-transform (CZT) algorithms.

11. A method of determining a magnitude of, and a distance to, one or more unknown passive intermodulation (PIM) sources associated with a network under test, comprising:
using a scalar PIM measuring instrument;
using a reference PIM source adapted to be arranged between the network under test and the scalar PIM measuring instrument and configured to introduce a reflected signal to the scalar PIM measuring instrument in response to the output frequency;
wherein the reference PIM source has a magnitude and distance from a detector of the scalar PIM measuring instrument that is substantially known when the reference PIM source is arranged between the network under test and the scalar PIM measuring instrument;
connecting the network under test with the scalar PIM measuring instrument such that the reference PIM source is arranged between the network under test and the scalar PIM measuring instrument;
transmitting output signals from the scalar PIM measuring instrument to the network under test;
systematically changing the output frequency of the output signals to produce a series of response signals of varying frequency
obtaining scalar data at the scalar PIM measuring instrument, the scalar data representing a combination of signals from the unknown PIM sources and the reference PIM source;
extracting distance and magnitude information about the unknown PIM sources located along the network under test from scalar data obtained by the scalar PIM measuring instrument.

12. The method of claim 11, wherein the magnitude and distance to the unknown PIM sources associated with the network under test is extracted by performing on the obtained scalar magnitudes at least one of inverse fast Fourier transform (FFT) algorithms, sine wave extraction algorithms, and chirp z-transform (CZT) algorithms.

13. The method of claim 11, wherein the scalar PIM measuring instrument includes a port and the reference PIM source is a component of the scalar PIM measuring instrument;
the method further comprising:
connecting the network under test with the port.

14. The method of claim 11, wherein the scalar PIM measuring instrument includes a first port, and the reference PIM source includes a second port and a third port;
the method further comprising:
connecting the second port of the reference PIM source with the scalar PIM measuring instrument; and
connecting the network under test with the third port of the reference PIM source.

* * * * *